United States Patent
Ling et al.

(10) Patent No.: US 11,463,845 B2
(45) Date of Patent: Oct. 4, 2022

(54) PROVIDING TO A COMMUNICATION SERVICE NODE USER PLANE TIMING INFORMATION FOR AN MBMS BEARER

(71) Applicant: Telefonaktiebolaget LM Ericsson (publ), Stockholm (SE)

(72) Inventors: Jie Ling, Shanghai (CN); Haogang Xu, Täby (SE); Wenhu Tang, Stockholm (SE); Jinyang Xie, Shanghai (CN); Wenliang Xu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/059,323

(22) PCT Filed: May 21, 2019

(86) PCT No.: PCT/EP2019/063068
§ 371 (c)(1),
(2) Date: Nov. 27, 2020

(87) PCT Pub. No.: WO2019/228856
PCT Pub. Date: Dec. 5, 2019

(65) Prior Publication Data
US 2021/0195381 A1    Jun. 24, 2021

(30) Foreign Application Priority Data
May 28, 2018   (WO) ................ PCT/CN2018/088729

(51) Int. Cl.
*H04W 76/40*   (2018.01)
*H04W 4/06*    (2009.01)
(Continued)

(52) U.S. Cl.
CPC ............. *H04W 4/06* (2013.01); *H04W 4/12* (2013.01); *H04W 4/50* (2018.02); *H04W 76/40* (2018.02)

(58) Field of Classification Search
CPC .......... H04W 4/06; H04W 4/12; H04W 4/50; H04W 76/40
See application file for complete search history.

(56) References Cited

U.S. PATENT DOCUMENTS

2014/0325580 A1   10/2014  Lohmar et al.
2018/0332462 A1*  11/2018  Kim ...................... H04W 4/70

FOREIGN PATENT DOCUMENTS

KR    2012 0019012 A   3/2012
WO    2017 078491 A1   5/2017

OTHER PUBLICATIONS

3GPP TS 29.061 v15.2.0; Technical Specification; 3rd Generation Partnership Project; Technical Specification Group Core Network and Terminals; Interworking between the Public Land Mobile Network (PLMN) supporting packet based services and Packet Data Networks (PDN) (Release 15)—Mar. 2018.
(Continued)

*Primary Examiner* — Joseph E Dean, Jr.
(74) *Attorney, Agent, or Firm* — Baker Botts, LLP

(57) ABSTRACT

A SC informs a communication service (CS) node (e.g., GCS AS) of a data transfer start time for the bearer (i.e., the user plane ready time for the bearer). Additionally, in some embodiments, the SC informs the communication service node (e.g., GCS AS) as to a data transfer stop time for the bearer. This provides a distinct advantage because the CS node will now have information as to when it should start (and stop) data delivery, thereby leading to a higher quality of experience (QoE) of MBMS delivery.

14 Claims, 12 Drawing Sheets

(51) Int. Cl.
    *H04W 4/50*    (2018.01)
    *H04W 4/12*    (2009.01)

(56) References Cited

OTHER PUBLICATIONS

3GPP TS 29.468 v15.2.0; Technical Specification; 3rd Generation Partnership Project; Technical Specification Group Core Network and Terminals; Group Communication System Enablers for LTE (GCSE_LTE); MB2 Reference Point; Stage 3 (Release 15)—Dec. 2017.
PCT International Search Report for International application No. PCT/EP2019/063068—dated Aug. 21, 2019.
PCT Written Opinion of the International Searching Authority issued for International application No. PCT/EP2019/063068—dated Aug. 21, 2019.
EPO Communication Pursuant to Article 94(3) EPC issued for Application No. 19 729 449.9-1213—dated Feb. 3, 2022.

* cited by examiner

PROVIDING TO A COMMUNICATION SERVICE NODE USER PLANE TIMING INFORMATION FOR AN MBMS BEARER

PRIORITY

This nonprovisional application is a U.S. National Stage Filing under 35 U.S.C. § 371 of International Patent Application Serial No. PCT/EP2019/063068 filed May 21, 2019 and entitled "PROVIDING TO A COMMUNICATION SERVICE NODE USER PLANE TIMING INFORMATION FOR AN MBMS BEARER" which claims priority to International Patent Application Serial No. PCT/CN2018/088729 filed May 28, 2018 both of which are hereby incorporated by reference in their entirety.

TECHNICAL FIELD

Disclosed are embodiments related to providing to a communication service (CS) node (e.g., a Group CS (GCS) application server (AS)) user plane timing information for a Multimedia Broadcast/Multicast Service (MBMS) bearer.

BACKGROUND

Evolved MBMS (eMBMS) is a broadcasting service offered via Evolved Packet Systems (EPS) including E-UTRAN (LTE) and UTRAN access. Typical use cases are described in the following paragraphs.

In one use case, media content is delivered to user equipments (UEs) in a highly gathered area (e.g., a stadium or arena). An eMBMS system can use the MBMS Download Delivery Method (UDP/FLUTE) as protocol to deliver Live TV content to UEs. Media contents according to DASH are delivered as segment files over MBMS Download.

In another use case, top on-demand files (e.g., Android update) are delivered to the UEs. eMBMS system can use the MBMS Download Delivery Method (UDP/FLUTE) as protocol to deliver top popular files such as Android update, YouTube clip preloading, top popular movies.

In another use case UDP/IP packets flow are delivered to the UE. The BM-SC provides group communication delivery by receiving UDP/IP packets and forwarding them over the MBMS path provided by the MBMS Bearer Service.

MCPTT Over LTE Broadcast:

A Mission Critical Push-to-Talk (MCPTT) AS is an example of a GCS AS. In the current legacy MCPTT solution, MCPTT only supports and uses the unicast transmission mode. Unicast transmission is defined as the sending of data to a single network destination identified by a unique address. Unicast transmission uses dedicated radio resources, and is triggered by the end user when needed. In the mobile transmission network, radio resources are limited, and depend upon demand. Therefore, the end user Quality of Experience (QoE) cannot always be guaranteed.

For MCPTT over Long Term Evolution (LTE) (a.k.a., 4G), LTE broadcast is an important supplementary downlink delivery method. LTE broadcast can be used to broadcast content to a large number of subscribers simultaneously without delays or disconnections, which enables the support of large groups. In 3GPP TS 22.179, the MCPTT service is required to support a minimum of 2000 MCPTT users within an MCPTT group or a combination of different MCPTT groups, in every cell of the MCPTT system. To fulfill such requirement, the LTE broadcast delivery method is a must for the MCPTT over LTE.

The MCPTT AS and the UE use the Evolved Packet System (EPS) bearer for the unicast delivery. The EPS bearers are used for the following: (1) GC1 signaling between the MCPTT AS and the UE; (2) uplink data from the UE to the MCPTT AS; and (3) downlink data from the MCPTT AS to the UE when the MBMS delivery is not desirable or possible.

The MCPTT AS uses MBMS bearers for the MBMS delivery. The MBMS bearer is used to transport data on the downlink from the MCPTT AS to the UE.

The MBMS bearers can be pre-established or dynamically established. To activate, deactivate, or modify MBMS bearers, the MCPTT AS communicates with the BM-SC over an MB2-C interface (a.k.a., "reference point"), which is a control-plane interface.

When receiving an MBMS bearer activation request via the MB2-C reference point, the BM-SC shall select an IP address and UDP port to receive user plane data from the GCS AS sending the request. The BM-SC shall then transparently forward any user plane data within UDP packets, which are received over the MB2-U reference point (user plane) at the allocated UDP port on the selected IP address, to the corresponding MBMS bearer at the SGi-mb interface. The BM-SC shall continue forwarding received payload until the corresponding MBMS Bearer is deactivated.

The BM-SC may use the MBMS Bearer Status Indication Procedure to notify the GCS AS of conditions affecting the delivery of services that use MBMS Delivery, for instance the expiry of a TMGI, activation of an MBMS bearer, and termination of an MBMS bearer.

SUMMARY

According to 3GPP TS 29.468 15.2.0 ("TS 29.468") clause 7.2, when receiving an MBMS bearer activation response via the MB2-C reference point, the GCS AS shall store the contained IP address and UDP port and may send user plane data for the corresponding MBMS bearer until the MBMS Bearer is deactivated.

TS 29.468 introduces the "Bearer Activated" notification event, wherein, if the BM-SC is configured to receive a delayed session start response from the MBMS GW, the BM-SC sends a Diameter GNR command to indicate the "Bearer Activated" to the GCS AS. When sending a "Bearer Activated" event, BM-SC acknowledges the MBMS bearer has been established successfully in the LTE broadcast nodes (e.g., BM-SC, MBMS GW, MME, eNB, and MCE). But, even though the MBMS bearer has been established successfully in the LTE broadcast nodes, this does not mean the user plane is ready for data transmission. Accordingly, from GCS AS perspective, the GCS AS should not assume that if it starts data delivery immediately after receiving a "Bearer Activated" event that the data will be broadcast over the air.

The MBMS-Start-Time attribute-value-pair (AVP) (AVP code 3507) in the MB2-C activate bearer procedure is of type Time and indicates a requested time when an MBMS bearer shall be allocated. If the MBMS-Start-Time AVP is set by the GCS AS, which indicates the MBMS bearer shall be started in future, it should be fine for the GCS AS to assume the user plane for the MBMS bearer should be ready at this time. But it is also possible for the GCS AS to omit the MBMS-Start-Time AVP from the activate bearer message. In this case, the GCS AS has no idea when precisely the user plane would be ready for the MBMS bearer. Also, in case the requested MBMS-Start-Time is too soon in the future, the GCS AS cannot guarantee the user plane will be ready at that point. For example, if the requested MBMS-Start-Time is 20 seconds later, while eNB requires more than 40 seconds for the resource allocation, obviously, 20 seconds later, the user plane for the MBMS bearer will not be ready. Hence, there would be a gap between the "Bearer Activated" event and the user plane ready time, because the eNB would require some time for the resource allocation and admission control. Similar problems exist with respect to the bearer deactivation for the termination of MBMS data delivery. For example, in the case where the GCS AS receives a "Bearer Terminated" event notification, this does not mean the user plane for the MBMS bearer has been terminated already. That is, there may still be some time for the GCS AS to broadcast the data until the actual user plane is down. In short, according to TS 29.468 15.2.0, the GCS AS does not know the accurate time to start or stop the MBMS data delivery (i.e., the user plane ready time), even after receiving a "Bearer Activated" event notification and "Bearer Terminated" event notification.

To remedy at least some of the above issues, this disclosure describes embodiments in which the BM-SC informs a communication service (CS) node (e.g., GCS AS) of the data transfer start time for the bearer (i.e., the user plane ready time). This data transfer start time provided by the BM-SC to the CS node may be an estimate of the data transfer start time as estimated by the BM-SC or it may be an actual data transfer start time originating from an Multi-cell/multicast Coordination Entity (MCE) and passed to the BM-SC via an MME and an MBMS GW. Additionally, in some embodiments, the BM-SC informs the communication service node (e.g., GCS AS) as to the data transfer stop time (i.e., the accurate time to stop MBMS data delivery). This data transfer stop time may be estimated by BM-SC. This provides a distinct advantage because the CS node will now have information as to when it should start and/or stop MBMS data delivery, thereby leading to a higher quality of experience (QoE) of the MBMS delivery.

For example, in one aspect there is provided a method for providing to a CS node user plane timing information (i.e. information specifying the data transfer start time). In one embodiment, the method includes receiving, at a service center (SC), a first bearer request message requesting activation of a bearer, wherein the first bearer request message was transmitted by the CS node. In one embodiment, the SC may be a BM-SC. In another embodiment, the SC may be a Session Management Function (SMF) in a 5G core (5GC) which offers MBMS bearer services towards Group Communication Service Application Servers (GCS AS). The method also includes, after receiving the first bearer request message, performing a process comprising: determining, by the SC, a data transfer start time for the bearer (e.g., estimating the data transfer start time or receiving a message indicating an actual data transfer start time); and the SC sending to the CS node a first message comprising information specifying the determined data transfer start time.

In some embodiments, the first message transmitted to the CS node is a first bearer response message (e.g., an MBMS-Bearer-Response AVP or a message including such an AVP) responsive to the first bearer request message, wherein the first bearer response message comprises information indicating that the requested bearer activation was successful. For example, in one embodiment, the first message is a GAA command comprising an MBMS-Bearer-Response AVP comprising an MBMS-Data-Transfer-Start AVP containing the information specifying the determined data transfer start time. Such determined data transfer start time may be estimated by the SC.

In some embodiments, the first message transmitted to the CS node is a bearer event notification message. For example, in one embodiment, the first message is a GNR command comprising an MBMS-Bearer-Event-Notification AVP comprising an MBMS-Data-Transfer-Start AVP containing the information specifying the determined data transfer start time. Such determined data transfer start time may be estimated by the SC or passed from an MCE to SC via MME and GW. For the latter case, the MCE may include information specifying the actual data transfer start time in a session start response sent to the MME. In one embodiment, the MME may receive multiple session start response messages (e.g., each one of a plurality of MCEs may send to the MME a session start response message containing information specifying a data transfer start time), the MME selects the earliest of the specified data transfer start times, and include in a session start response sent to GW information specifying the selected data transfer start time. GW receives the session start response message from the MME, and then includes the data transfer start time in a session start response to the SC. The SC receives the session start response message from the GW, and then includes the data transfer start time in the event notification message for MBMS bearer activated.

In some embodiments, the first bearer request message does not include information indicating a requested time at which the bearer shall be allocated (e.g., does not include an "MBMS-Start-Time AVP"), and the method further comprises, as a result of successfully processing the first bearer request message, the SC sending to a gateway (e.g., MBMS GW) a second message comprising the information specifying the determined data transfer start time (e.g., a request message comprising a "MBMS-Time-To-Data-Transfer AVP" and a "MBMS-Data-Transfer-Start AVP").

In some embodiments, the first bearer request message includes time information indicating a requested time at which the bearer shall be allocated (e.g., the bearer request includes an "MBMS-Start-Time AVP"), and the method further comprises, as a result of successfully processing the first bearer request message, the SC sending to the gateway a second message comprising the information specifying the determined data transfer start time. In some embodiments, the determined data transfer start time is a point in time subsequent to the requested time indicated by the time information included in the first bearer request message.

In some embodiments, the method further comprises the SC receiving a response message, transmitted by the gateway, responsive to the second message, and the first message transmitted to the CS node is transmitted by the SC as a result of the SC receiving the response message transmitted by the gateway. For example, in some embodiments, the first message is a bearer event notification message further comprising information indicating that the bearer was activated (e.g., a message including an "MBMS-Bearer-Event" AVP).

In some embodiments, the method also includes the SC determining a data transfer stop time for the bearer; and the SC transmitting to the CS node a message comprising information indicating the data transfer stop time. In some embodiments, the method further comprises the SC receiving a second bearer request message transmitted by the CS node, the second bearer request message triggers the SC to determine the data transfer stop time, and the message comprising the information indicating the data transfer stop time is one of: i) a second bearer response message that is responsive to the second bearer request message and ii) a bearer event notification message that is transmitted by the SC after the SC receives a particular response message from the gateway. In some embodiments, the SC detects the expiration of an identifier (e.g., TMGI), and the SC determines the data transfer stop time after detecting the expiration of the identifier.

In another aspect there is provided a method performed by a communication service node (e.g., GCS AS) for delivering user plane data. In one embodiment, the method includes transmitting to a SC a first bearer request message requesting activation of a bearer and receiving a first message transmitted by the SC, the first message comprising information specifying a determined data transfer start time for the bearer. The method further includes, after receiving the first message, setting a timer to expire at a point-in-time selected based on the information indicating the data transfer start time, and, as a result of detecting the expiration of the timer, transmitting user plane data to a particular destination point associated with the bearer. In some embodiments, the method further includes, after receiving the first message, obtaining user plane data and buffering the obtained user plane data, and transmitting the buffered user plane data to the particular destination point associated with the bearer as a result of having detected the expiration of the timer.

In another aspect there is provided a method performed by a coordination entity (CE). The method includes the CE receiving a request message comprising information specifying an estimated data transfer start time for a bearer. After receiving the request message, the CE determines an actual data transfer start time for the bearer. After determining the actual data transfer start time, the CE generates a response message responsive to the request message, wherein generating the response message comprises including in the response message start time information specifying the actual data transfer start time for the bearer. The CE then transmits the response message to a service center.

In another aspect there is provided a method performed by a network node. The method includes the network node transmitting a first request message to a first coordination entity. After this step, the network node receives a first response message comprising first start time information generated by the first coordination entity, wherein the first start time information generated by the first coordination entity specifies a first data transfer start time determined by the first coordination entity. The network node also receives a second response message comprising second start time information generated by a second coordination entity, wherein the second start time information generated by the second coordination entity specifies a second data transfer start time determined by the second coordination entity. The network node compares the first start time information with the second start time information time to determine which specifies the earliest data transfer start time. As a result of determining that the first start time information specifies a data transfer start time that is earlier than the data transfer start time that is specified by the second start time information, the network node includes the first start time information in a third response message and transmits the third response message to a second network node. In some embodiments the method also includes the network node receiving a message comprising information specifying an estimated data transfer start time for a bearer, wherein the network node transmits the first request message as a result of receiving the message comprising the information specifying the estimated data transfer start time. In some embodiments, the network node is a gateway and the step of transmitting the first request message to the first coordination entity (CE) comprises transmitting the first request message to a mobility management node that is configured to transmit the message to the first CE. In some embodiments the network node is a mobility management node and the step of transmitting the first request message to the first coordination entity (CE) comprises transmitting the first request message to the first CE. In some embodiments the network node is a service center and the step of transmitting the first request message to the first coordination entity (CE) comprises transmitting the first request message to a gateway that is configured to transmit the message to the first CE.

BRIEF DESCRIPTION OF THE DRAWINGS

The accompanying drawings, which are incorporated herein and form part of the specification, illustrate various embodiments.

DETAILED DESCRIPTION

Figure 1:
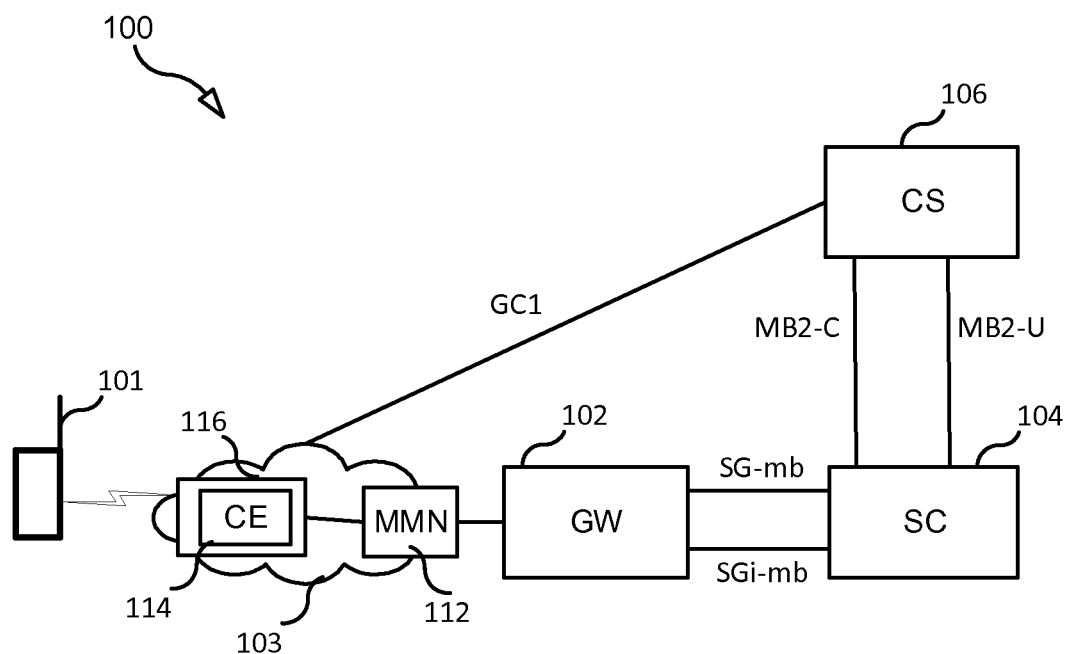
FIG. 1 illustrates a communications network according to one embodiment.

FIG. 1 illustrates a communications network 100 according to one embodiment. As illustrated in FIG. 1, communications network 100 includes a communication service (CS) node 106, which in one embodiment is a Group Communication Service Application Server (GCS AS 106), that can communicate with a service center (SC) 104, such as, for example, a Broadcast Multicast Service Center (BM-SC), via, for example, the MB2-C reference point (control plane) and the MB2-U reference point (user plane). In another embodiment, SC 104 may be a Session Management Function (SMF) in 5GC which offers MBMS bearer services towards Group Communication Service Application Servers (GCS AS). Similarly, SC 104 communicates with a gateway (GW) 102 (e.g., an MBMS GW 102 as shown) via a control plane (e.g., the SG-mb reference point) and a user plane (e.g., SGi-mb reference point). GW 102 communicates with user equipments (UEs) via a network 103, which typically includes an access network (e.g., a radio access network (RAN)) and core network nodes, such as, for example, a mobility management node (MMN) 112 (e.g., a node that implements a Mobility Management Entity (MME) or Access and Mobility Management Function (AMF)). In the example shown, the access network includes a base station 116 (e.g., eNB or gNB) that includes, among other things, a coordination entity (CE) 114 (e.g., an MCE). But, in other embodiments, the CE 114 may be implemented in a stand-alone device that is coupled to the base station 116. As used herein, a UE is any device capable of receiving data transmitted by GW 102.

Figure 2:
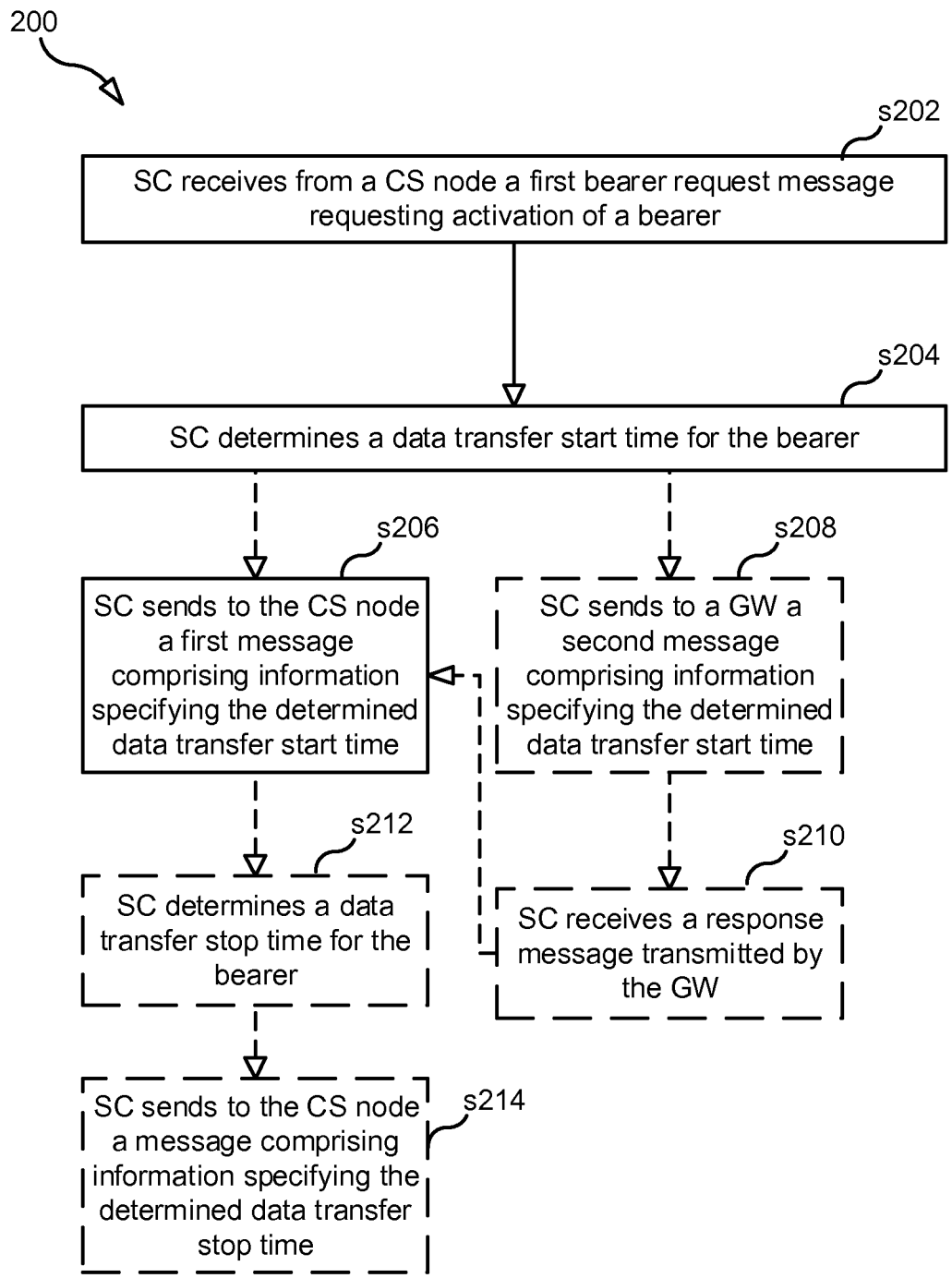
FIG. 2 is a flow chart illustrating a process according to one embodiment.

FIG. 2 is flowchart illustrating a process 200, according to an embodiment, for providing to a communication service (CS) node 106 (e.g., GCS 106) user plane timing information. Process 200 is performed by SC 104. Process 200 may begin in step s202.

Figure 3:
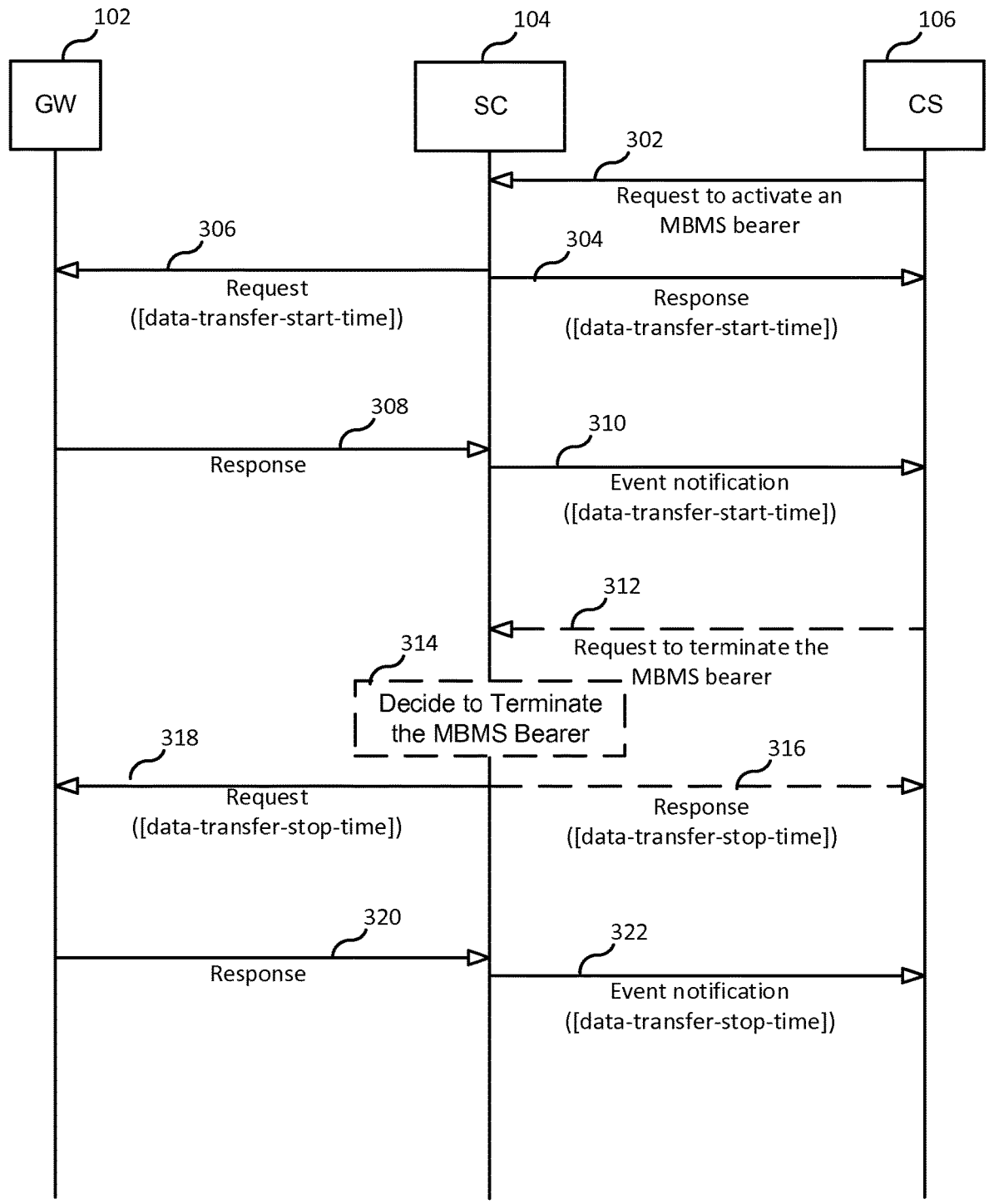
FIG. 3 is a message flow diagram according to one embodiment.

In step s202, SC 104 receives a first bearer request message 302 (see FIG. 3) requesting activation of a bearer (e.g., an MBMS bearer), wherein the first bearer request message was transmitted by CS node 106.

In some embodiments, the bearer request message 302 consists of or includes a MBMS-Bearer-Request AVP, an example of which is defined in section 6.4.6 of 3GPP TS 29.468 v 15.2.0 ("TS 29.468"). For example, the bearer request message 302 may be GCS-Action-Request (GAR) command, an example of which is defined in section 6.6.2 of TS 29.468, and the GAR command may comprise the MBMS-Bearer-Request AVP, which may include, among other things, an MBMS-StartStop-Indication AVP and an MBMS-Start-Time AVP.

Figure 10:
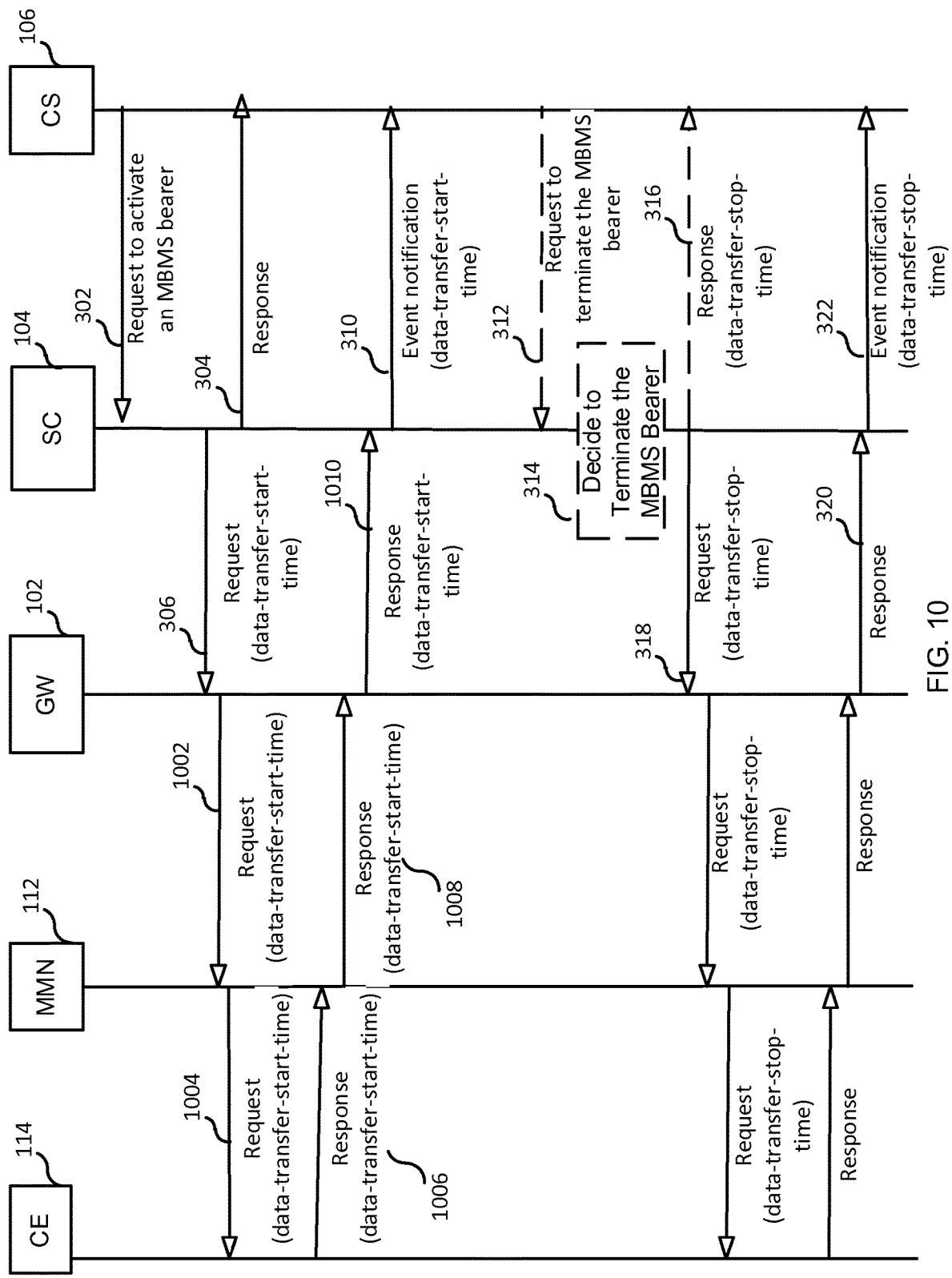
FIG. 10 is a message flow diagram according to one embodiment.

After receiving the first bearer request message 302, the SC performs a process comprising: determining data transfer start time for the bearer (step s204) and sending to CS node 106 a first message comprising information specifying the determined data transfer start time (step s206). In some embodiments, step s204 (i.e., determining data transfer start time) comprises the SC estimating the data transfer start time based on information it has obtained regarding one or more components of network 103. In other embodiments, step s204 (i.e., determining data transfer start time) comprises the SC receiving a message (e.g. Session Start Response message) that was transmitted by the GW or MMN, which message includes information specifying a data transfer start time that was determined by CE 114. This latter embodiment is illustrated in FIG. 10.

In some embodiments, the first message transmitted to CS node 106 in step s206 is a first bearer response message 304 (see FIG. 3) responsive to the first bearer request message. The first bearer response message 304 in this example further contains information indicating that the requested bearer activation was successful, a destination point associated with the bearer (i.e., Internet Protocol (IP) address, and a port number (e.g., a User Datagram Protocol (UDP) port number). The first bearer response message 304 may consist of or comprise an MBMS-Bearer-Response AVP comprising the information specifying the determined data transfer start time, the IP address, and the port number. For example, first bearer response message 304 may be a GCS-Action-Answer (GAA) command, an example of which is defined in section 6.6.3 of TS 29.468, that contains an MBMS-Bearer-Response AVP, which contains, among other things, a BMSC-Port AVP containing the port number and a BMSC-Address AVP containing the IP address. This disclosure proposes to modify the definition of the MBMS-Bearer-Response AVP in TS 29.486. Currently, TS 29.486 defines the MBMS-Bearer-Response AVP as shown in table 1.

TABLE 1

| MBMS-Bearer-Response::= | < AVP Header: 3505 ><br>[ TMGI]<br>[ MBMS-Flow-Identifier ]<br>[ MBMS-Session-Duration ]<br>[ MBMS-Bearer-Result ]<br>[ BMSC-Address ]<br>[ BMSC-Port ]<br>[ MB2U-Security ]<br>*[ Radio-Frequency ]<br>*[ AVP ] |
|---|---|

This disclosure proposes extending the definition as shown in table 2 below.

TABLE 2

| MBMS-Bearer-Response::= | < AVP Header: 3505 ><br>[ TMGI]<br>[ MBMS-Flow-Identifier ]<br>[ MBMS-Session-Duration ]<br>[ MBMS-Bearer-Result ]<br>[ BMSC-Address ]<br>[ BMSC-Port ]<br>[ MB2U-Security ]<br>[ MBMS-Data-Transfer-Start]<br>[ MBMS-Data-Transfer-Stop]<br>*[ Radio-Frequency ]<br>*[ AVP ] |
|---|---|

As shown above, this disclosure proposes defining the MBMS-Bearer-Response AVP such that the MBMS-Data-Transfer-Start AVP and the MBMS-Data-Transfer-Stop AVP are optional elements of the MBMS-Bearer-Response AVP. Accordingly, in some embodiments, the first message comprising information specifying the determined data transfer start time is a GAA command 304 that includes an MBMS-Bearer-Response AVP that includes a MBMS-Data-Transfer-Start AVP that contains the information specifying the determined data transfer start time. The MBMS-Data-Transfer-Start AVP is defined in section 20.5a.7 of 3GPP TS 29.061 v 15.2.0 ("TS 29.061"). Accordingly, in one embodiment, the information specifying the determined data transfer start time is a value that indicates the time in seconds relative to 00:00:00 on 1 Jan. 1900 (calculated as continuous time without leap seconds and traceable to a common time reference) where binary encoding of the integer part is in the first 32 bits and binary encoding of the fraction part in the last 32 bits. The fraction part is expressed with a granularity of ½**32 second.

In some embodiments, process 200 further includes the step of SC 104, as a result of successfully processing the first bearer request message 302, sending to a network node (e.g., GW 102 or MMN 112) a second message 306 (see FIG. 3) that includes information specifying the determined data transfer start time (see FIG. 2 at step s208), and, in such embodiments, SC104 may receive a response message 308 (see FIG. 3) (see step s210 of FIG. 2) that was transmitted by the network node in response to second message 306. In one embodiment, the second message 306 is a "Session Start Request" and response message 308 is a "Session Start Response," as described in, for example, section 8.3.2 of 3GPP TS 23.246 v 15.0.0. More specifically, as described in section 20.3.1. of TS 29.061 the second message 306 may be a Re-Auth-Request (RAR) command and the response message 308 may be a Re-Auth-Answer (RAA) command.

In some embodiments, the first message that is transmitted to CS node 106 in step s206 is transmitted by SC 104 as a result of SC 104 receiving the response message 308. In such an embodiment, the first message may be a bearer event notification message 310 (see FIG. 3) further comprising information indicating that the bearer was activated. The bearer event notification message 310 may consist of or comprise an MBMS-Bearer-Event-Notification AVP. For example, bearer event notification message 310 may be a GCS-Notification-Request (GNR) command, an example of which is defined in section 6.6.4 of TS 29.468, that contains an MBMS-Bearer-Event-Notification AVP. This disclosure proposes to modify the definition of the MBMS-Bearer-Event-Notification AVP in TS 29.486. Currently, section 6.4.5. of TS 29.486 defines the MBMS-Bearer-Event-Notification AVP as shown in table 3.

TABLE 3

| MBMS-Bearer-Event-Notification::= | < AVP Header: 3503 ><br>{ TMGI}<br>{ MBMS-Flow-Identifier }<br>{ MBMS-Bearer-Event }<br>*[ AVP ] |
|---|---|

This disclosure proposes extending the definition as shown in table 4 below.

TABLE 4

| MBMS-Bearer-Event-Notification::= | < AVP Header: 3503 ><br>{ TMGI}<br>{ MBMS-Flow-Identifier }<br>{ MBMS-Bearer-Event }<br>[ MBMS-Data-Transfer-Start]<br>[ MBMS-Data-Transfer-Stop]<br>*[ AVP ] |
|---|---|

As shown above, this disclosure proposes defining the MBMS-Bearer-Event-Notification AVP such that the MBMS-Data-Transfer-Start AVP and the MBMS-Data-Transfer-Stop AVP are optional elements of the MBMS-Bearer-Event-Notification AVP. Accordingly, in some embodiments, the first message comprising information specifying the determined data transfer start time is a GNR command 310 that includes an MBMS-Bearer-Event-Notification AVP that includes a MBMS-Data-Transfer-Start AVP that contains the information specifying the determined data transfer start time.

In some embodiments, the first bearer request message 302 does not include information indicating a requested time at which the bearer shall be allocated (e.g., does not include an "MBMS-Start-Time AVP"), but in other embodiments the first bearer request message 302 includes time information indicating a requested time at which the bearer shall be allocated (e.g., the bearer request 302 includes an "MBMS-Start-Time AVP"). In embodiment in which the first bearer request message 302 includes the time information indicating the requested time, the determined data transfer start time determined by SC 104 may be a point in time subsequent to the requested time indicated by the time information included in the first bearer request message 302. For example, the SC 104 may determine that the requested time is less than a threshold, and, as a result, determine a time that is greater than the requested time.

In some embodiments, process 200 further includes: SC 104 determining a data transfer stop time for the bearer (step s212) and SC 104 transmitting to CS node 106 a message (e.g., message 316 or 322) comprising information indicating the data transfer stop time (step s214). For instance, SC 104 may receive a second bearer request message 312 transmitted by CS node 106, and the second bearer request message triggers SC 104 to determine the data transfer stop time. In another embodiment, another event, such as expiration of a timer, causes SC to decide terminate the bearer (see step 314), which then triggers SC 104 to determine the data transfer stop time. In one embodiment, the message comprising the information indicating the data transfer stop time is one of: i) a second bearer response message 316 that is responsive to the second bearer request message 312 and ii) a bearer event notification message 322 that is transmitted by SC 104 after SC 104 receives a particular response message 320 (e.g., Session Stop Response) from the network node in response to message 318 (e.g., a Session Stop Request transmitted by SC 104). In some embodiments, SC 104 detects the expiration of an identifier (e.g., TMGI), and SC 104 determines the data transfer stop time after detecting the expiration of the identifier.

FIG. 10 is a message flow diagram illustrating an embodiment in which SC 104 determines the data transfer start time by receiving a response message 1010 transmitted by a network node (in this example the network node is GW 102, but in other embodiments the network node is MMN 112) and obtaining from message 1010 start time information specifying a data transfer start time that was decided by CE 114. In this embodiment, SC 104 includes in message 310 (e.g., includes in the MBMS-Data-Transfer-Start AVP of message 310) the obtained start time information. An example of the message 1010 is shown in Table 5 below.

TABLE 5

| <RAA> ::= < Diameter Header: 258, PXY ><br><Session-Id><br>{Origin-Host}<br>{Origin-Realm}<br>[Result-Code]<br>[Experimental-Result]<br>[MBMS-StartStop-Indication]<br>[MBMS-GGSN-Address]; for unicast encapsulated user data<br>[MBMS-GGSN-Ipv6-Address]; for unicast encapsulated user data<br>[MBMS-User-Data-Mode-Indication]<br>[MBMS-GW-UDP-Port]; for unicast encapsulated user data<br>[MBMS-Data-Transfer-Start]; for the actual user plane ready time passed from MCEs<br>[Origin-State-Id]<br>[Error-Message]<br>[Error-Reporting-Host]<br>[Failed-AVP]<br>* [Redirected-Host]<br>[Redirected-Host-Usage]<br>[Redirected-Host-Cache-Time]<br>[Proxy-Info]<br>* [Supported-Features]<br>[Restart-Counter] |
|---|

As shown in Table 5 above, message 1010 in one embodiment is a RE-Auth-Answer (RAA) Command defined in TS 29.061 but extended to include the MBMS-Data-Transfer-Start AVP.

In another embodiment, SC 104 may wait a certain amount of time before sending message 310. During this window of time, SC 104 may receive multiple response messages 1010, each specifying an actual data transfer start time determined by a different CE. In such a scenario, SC 104 may determine the earliest of the specified data transfer start times, then includes in response message 310 the start time information specifying the earliest determined actual data transfer start time, and then sends message 310 to CS 106.

As shown in FIG. 10, in response to receiving message 306, which in this embodiment includes timing information specifying an estimated data transfer start time that was estimated by SC 104, GW 102 transmits to (e.g., transmits directly to or transmits towards) MMN 112 a request message 1002 (e.g., Session Start Request message) containing the timing information from message 306. In response to receiving message 1002, MMN 112 transmits to CE 114 a message 1004 that includes the timing information from message 1002.

In response to receiving message 1004, which includes the timing information specifying the estimated data transfer start time that was estimated by SC 104, CE 114 determines an actual data transfer start time, which may be the same as or different from the estimated data transfer start time that was estimated by SC 104. After determining the actual data transfer start time, CE 114 transmits to MMN 112 a response message 1006 (e.g., Session Start Response message) that includes start time information specifying the actual data transfer start time that was decided by CE 114.

An example of the information elements (IE) that may be included in message 1006 is shown in Table 6 below.

TABLE 6

| IE/Group Name | Presence | IE type and reference | Criticality | Assigned Criticality |
|---|---|---|---|---|
| Message Type | M | 9.2.1.1 | YES | reject |
| MME MBMS M3AP ID | M | 9.2.3.2 | YES | ignore |
| MCE MBMS M3AP ID | M | 9.2.3.1 | YES | Ignore |
| Time of MBMS Data Transfer | O | | YES | Ignore |
| Criticality Diagnostics | O | 9.2.1.7 | YES | Ignore |

As shown in Table 6 above, message 1006 in one embodiment is an MBMS Session Start Response message defined in 3GPP TS 36.444 v 15.0.0 ("TS 36.444") but extended to include the "Time of MBMS Data Transfer" IE. In one embodiment, the semantics for the "Time of MBMS Data Transfer" IE is defined in chapter TS 36.444, chapter 9.2.3.9 ("Absolute Time of MBMS Data"). That is, in on embodiment the "Time of MBMS Data Transfer" IE contains a value specifying the time in seconds relative to 00:00:00 on 1 Jan. 1900.

In this example, immediately after receiving response message 1006, MMN 112 transmit to GW 102 a response message 1008 (e.g., a Session Start Response message) that includes the start time information specifying the actual data transfer start time that was decided by CE 114 (e.g., the value included in the "Time of MBMS Data Transfer" IE).

An example of the information elements (1E) that may be included in message 1008 is shown in Table 7 below

TABLE 7

| IEs | P | Condition/Comment | IE Type | Ins. |
|---|---|---|---|---|
| Cause | M | | Cause | 0 |
| Sender F-TEID for Control Plane | M | | F-TEID | 0 |
| MBMS Distribution Acknowledge | C | This IE shall be included on the Sn interface. | MBMS Distribution Acknowledge | 0 |
| Sn-U SGSN F-TEID | C | This IE shall be included on the Sn interface if some RNCs have not accepted IP multicast distribution. | F-TEID | 1 |
| MBMS Data Transfer Start | CO | This IE indicates the user plane availability time | Absolute Time of MBMS Data Transfer | 0 |
| Recovery | C | This IE shall be included if contacting the peer for the first time. | Recovery | 0 |
| Private Extension | O | | Private Extension | VS |

As shown in Table 7 above, message 1008 in one embodiment is an MBMS Session Start Response message defined in 3GPP TS 29.274 v 15.7.1 ("TS 29.274") but extended to include an "MBMS Data Transfer Start" IE that has a format as defined in TS 29.274 chapter 8.95 ("Absolute Time of MBMS Data Transfer").

GW 102 obtains the start time information from a message 1008 transmitted by MMN 112 and includes the obtained start time information in response message 1010 (e.g., a Session Start Response message), which GW 102 transmits to SC 104.

In another embodiment, GW 102 may wait a certain amount of time before sending message 1010 to SC 104. During this window of time, GW 102 may receive multiple response messages 1008, each specifying an actual data transfer start time determined by a different CE. In such a scenario, GW 102 may determine the earliest of the specified data transfer start times, then includes in response message 1010 the start time information specifying the earliest determined actual data transfer start time, and then sends message 1010 to SC 104.

As noted above, SC 104 determines the data transfer start time by receiving response message 1010 and obtaining therefrom the start time information specifying the actual data transfer start time that was decided by CE 114.

In some embodiments, MMN 112 transmits message 1004 to multiple CEs (e.g., message 1004 is transmitted to each CE included in a determined set of CEs), including CE 114. Zero or more of such CEs may transmit to MMN 112 a response message 1006 (i.e., a response message that includes start time information specifying the data transfer start time decided by the CE that transmitted the response message).

In one embodiment, in response to receiving the response message 1006, MMN 112 obtains from the response message 1006 the start time information included therein, adds the obtained start time information to response message 1008, and then transmits response message 1008 to GW 102. In another embodiment, MMN 112 may wait a certain amount of time before sending response message 1008. During this window of time, MMN 112 may receive multiple response messages 1006, each specifying an actual data transfer start time. In such a scenario, MMN 112 determines the earliest of the specified data transfer start times, then includes in response message 1008 the start time information specifying the earliest determined actual data transfer start time, and then sends message 1008 to GW 102.

Figure 4:
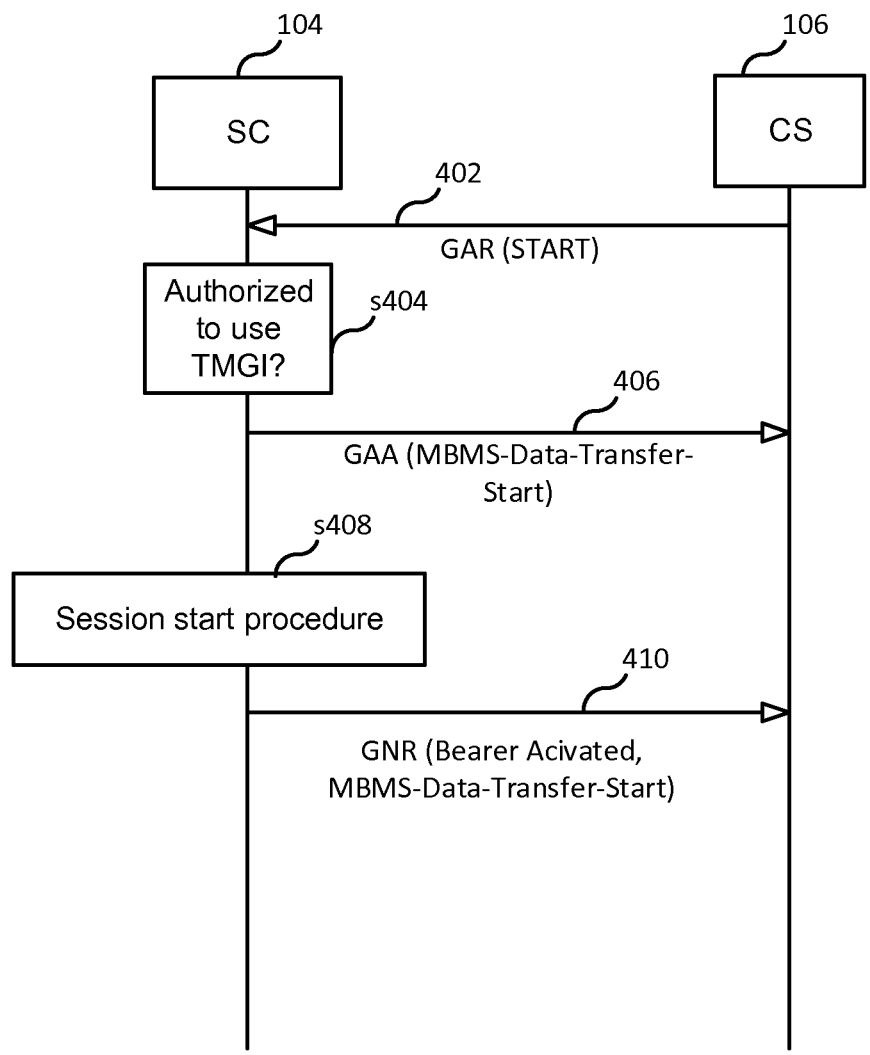
FIG. 4 is a message flow diagram according to one embodiment.

FIG. 4 is a message flow diagram illustrating an Activate MBMS Bearer Procedure according to an embodiment. As show in FIG. 4, GCS AS 106 transmits to SC 104 a GAR command 402 requesting activation of an MBMS bearer (i.e., the MBMS-StartStop-Indication AVP contained in the GAR command has a value of "START."). Upon reception of the GAR command including the MBMS-Bearer-Request AVP with the MBMS-StartStop-Indication AVP set to "START", the SC 104 determines whether GCS AS 106 is authorized to use the requested TMGI (step s404). After determining that GCS AS 106 is authorized to use the requested TMGI, SC 104 sends to GCS AS 106 a GAA command 406 comprising information specifying a determined data transfer start time for the bearer—i.e., information indicating the user plane ready time for the bearer (e.g., the GAA comprises an MBMS-Data-Transfer-Start AVP that comprises the information indicating the user plane ready time). As shown in FIG. 4, SC 104 also applies the session start procedure as defined in clause 20.3.1 of TS 29.061 (i.e., SC 104 transmits to gateway 102 an RAR command with a "start" indication) (step s408). As further shown in FIG. 4, SC 104 also transmits to GCS AS 106 a GNR command 410 (e.g., the GNR command is sent upon SC 104 receiving an RAA command transmitted by gateway 102 in response to the RAR command). In some embodiments, instead of (or in addition to) the GAA command 406 including the MBMS-Data-Transfer-Start AVP, the GNR command 410 may include the MBMS-Data-Transfer-Start AVP that contains the information indicating the user plane ready time.

Figure 5:
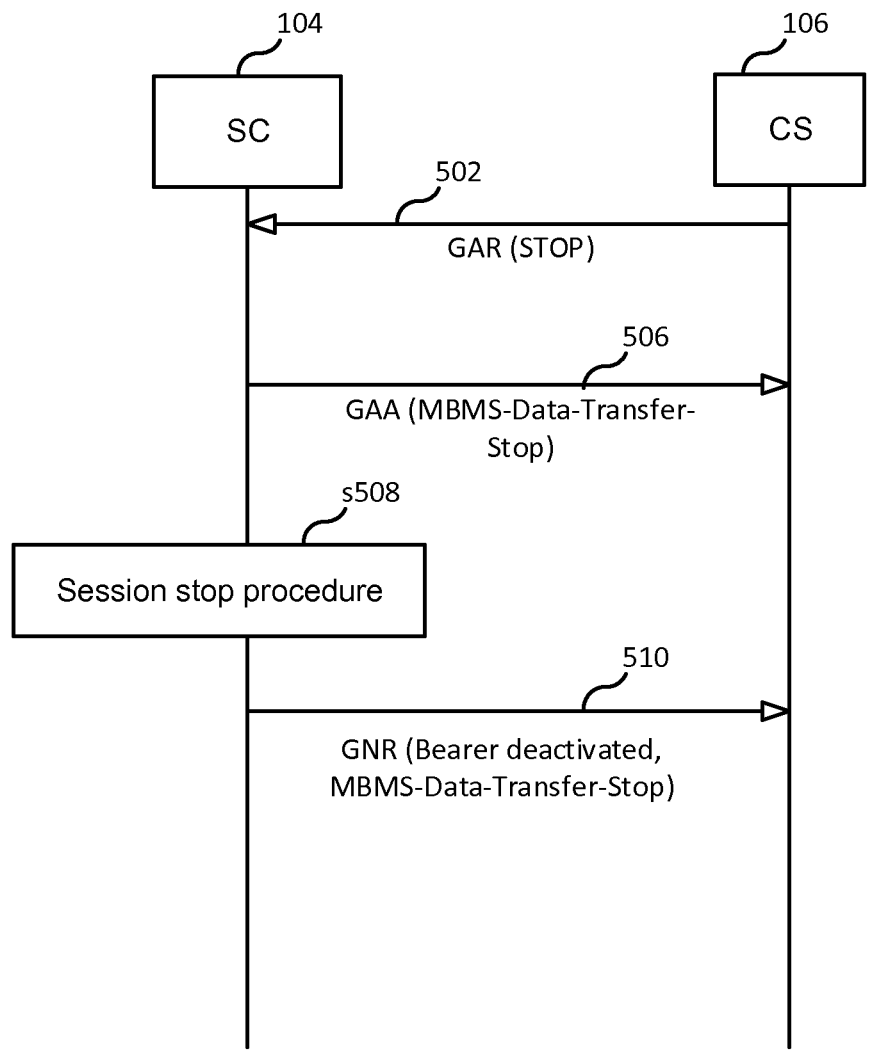
FIG. 5 is a message flow diagram according to one embodiment.

FIG. 5 is a message flow diagram illustrating a Deactivate MBMS Bearer Procedure according to an embodiment. As show in FIG. 5, GCS AS 106 transmits to SC 104 a GAR command 502 requesting deactivation of an MBMS bearer (i.e., the MBMS-StartStop-Indication AVP contained in the GAR command has a value of "STOP."). After receiving GAR command 502, SC 104 sends to GCS AS 106 a GAA command 506 comprising information specifying a determined data transfer stop time for the bearer—i.e., information indicating the user plane deactivation time (e.g., the GAA comprises an MBMS-Data-Transfer-Stop AVP that comprises the information indicating the user plane deactivation time). As shown in FIG. 5, SC 104 also applies the session stop procedure as defined in clause 20.3.3 of TS 29.061 (i.e., SC 104 transmits to gateway 102 an RAR command with a "stop" indication) (step s508). As further shown in FIG. 5, SC 104 also transmits to GCS AS 106 a GNR command 510 (e.g., the GNR command is sent upon SC 104 receiving an RAA command transmitted by gateway 102 in response to the RAR command). In some embodiments, instead of (or in addition to) the GAA command 506 including the MBMS-Data-Transfer-Stop AVP, the GNR command 510 may include the MBMS-Data-Transfer-Stop AVP that contains the information indicating the user plane deactivation time.

Figure 6:
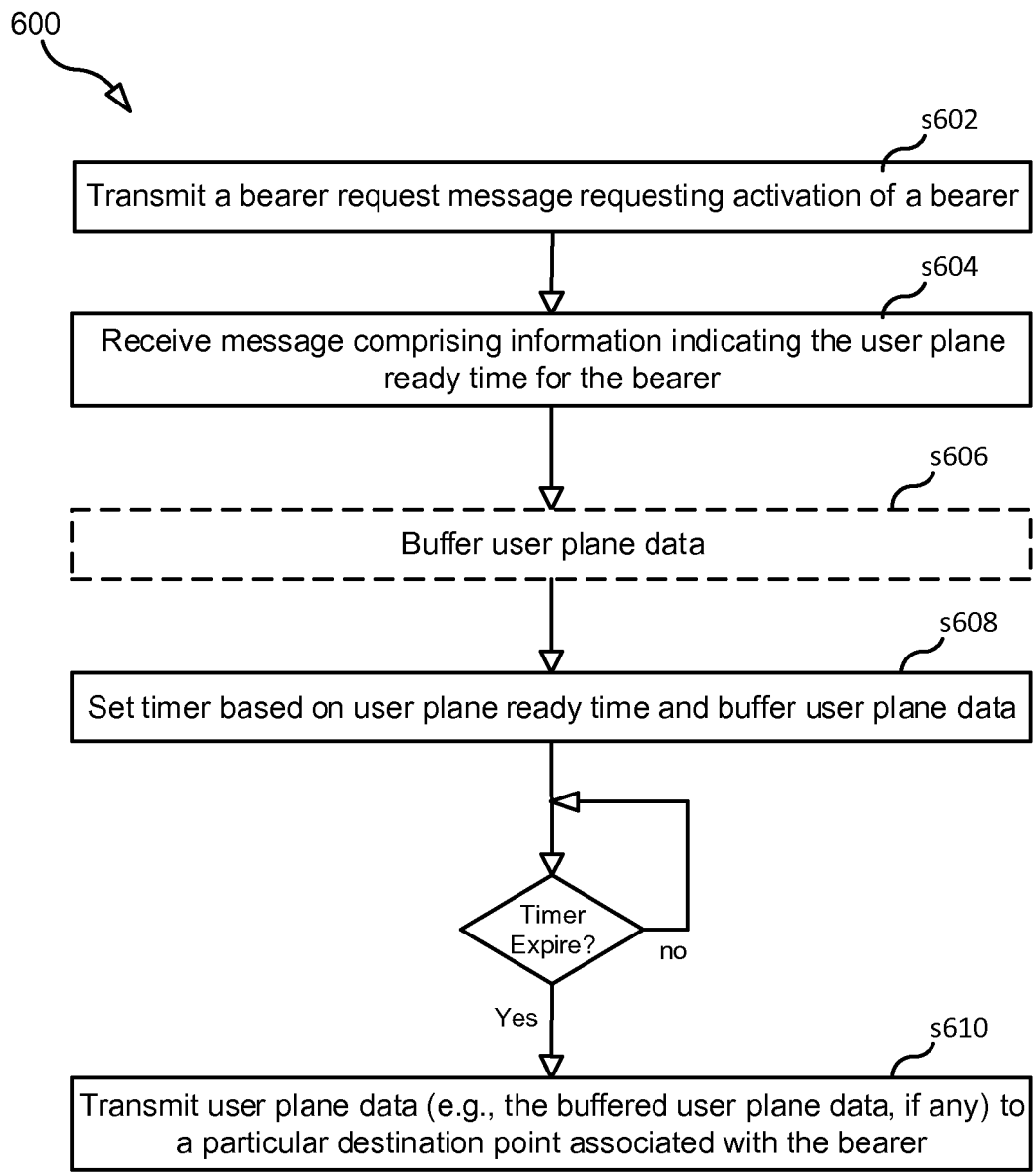
FIG. 6 is a flow chart illustrating a process according to one embodiment.

FIG. 6 is a flow chart illustrating a process 600 performed by CS node 106. Process 600 may begin in step s602.

In step s602, CS node 106 transmits to SC 104 the above described bearer request message 302 (see FIG. 3) requesting activation of a bearer (e.g., an MBMS bearer).

In step s604, CS node 106 receives a message comprising information indicating the user plane ready time for the bearer (i.e., the data transfer start time for the bearer). For example, the message received in step s602 is one of message 304 and event notification 310.

In step s606 (optional), CS node 106 buffers user plane data (e.g., CS node 106 stores the user plane data in a transmit queue). In some embodiments, instead of buffering the user plane data, CS node 106 may transmit the user plane data using a unicast bearer. In some embodiments, step s606 is performed after the timer has expired.

In step s608, upon receiving the message comprising the information indicating the user plane ready time (e.g., a bearer response message comprising the information), CS node 106 sets a timer to expire at a point-in-time selected based on the information indicating the user plane ready time. For example, if the information indicating the user plane ready time specifies that the user plane will be ready in 40 seconds, then in step s606 CS node 106 may set a time to expire in 40 seconds.

In step s610, which is performed as a result of the timer expiring, CS node 106 transmits user plane data (e.g., the buffered user plane data, if any) to a particular destination point associated with the bearer (i.e., a particular tuple comprising an IP address and port number associated with the bearer). As discussed above, message 304 may include the particular destination point associated with the bearer (i.e., message 304 may include an AVP containing the IP address and an AVP containing the port number). For example, in step s610, CS node 106 begins transmitting a stream of IP protocol data units (PDUs), wherein each IP PDU comprises a UDP PDU comprising user plane data, wherein each of the IP PDUs is addressed to the IP address of the destination point (i.e., the IP address is set as the destination address in the header of the IP PDU) and each of the UDP PDUs is addressed to the port number of the destination point (i.e., the port number is set as the destination port in the header of the UDP PDU).

Figure 11:
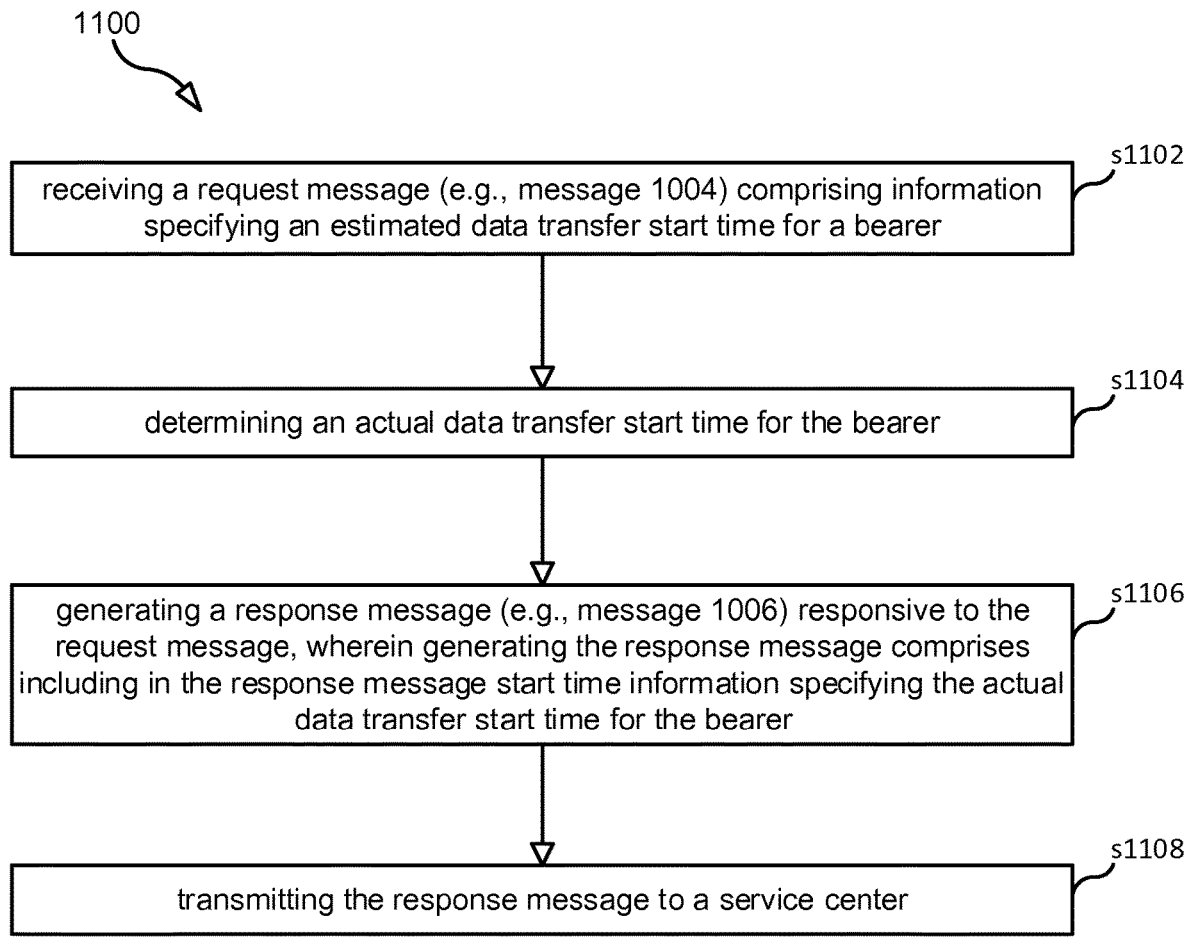
FIG. 11 is a flow chart illustrating a process according to one embodiment.

FIG. 11 is a flow chart illustrating a process 1100 performed by coordination entity (CE) (e.g. CE 114). Process 1100 may begin in step s1102.

Step s1102 comprises the CE receiving a request message (e.g., message 1004) comprising information specifying an estimated data transfer start time for a bearer.

Step s1104 comprises the CE, after receiving the request message, determining an actual data transfer start time for the bearer.

Step s1106 comprises the CE generating a response message (e.g., message 1006) responsive to the request message, wherein generating the response message comprises including in the response message start time information specifying the actual data transfer start time for the bearer.

Step s1108 comprises the CE transmitting the response message to a service center (e.g., SC 104). For example, in one embodiment CE transmits the response message to the service center by transmitting the response message to an MMN (e.g., MMN 112), which then sends towards the service center a response message comprising the start time information specifying the actual data transfer start time that was determined by the CE.

Figure 12:
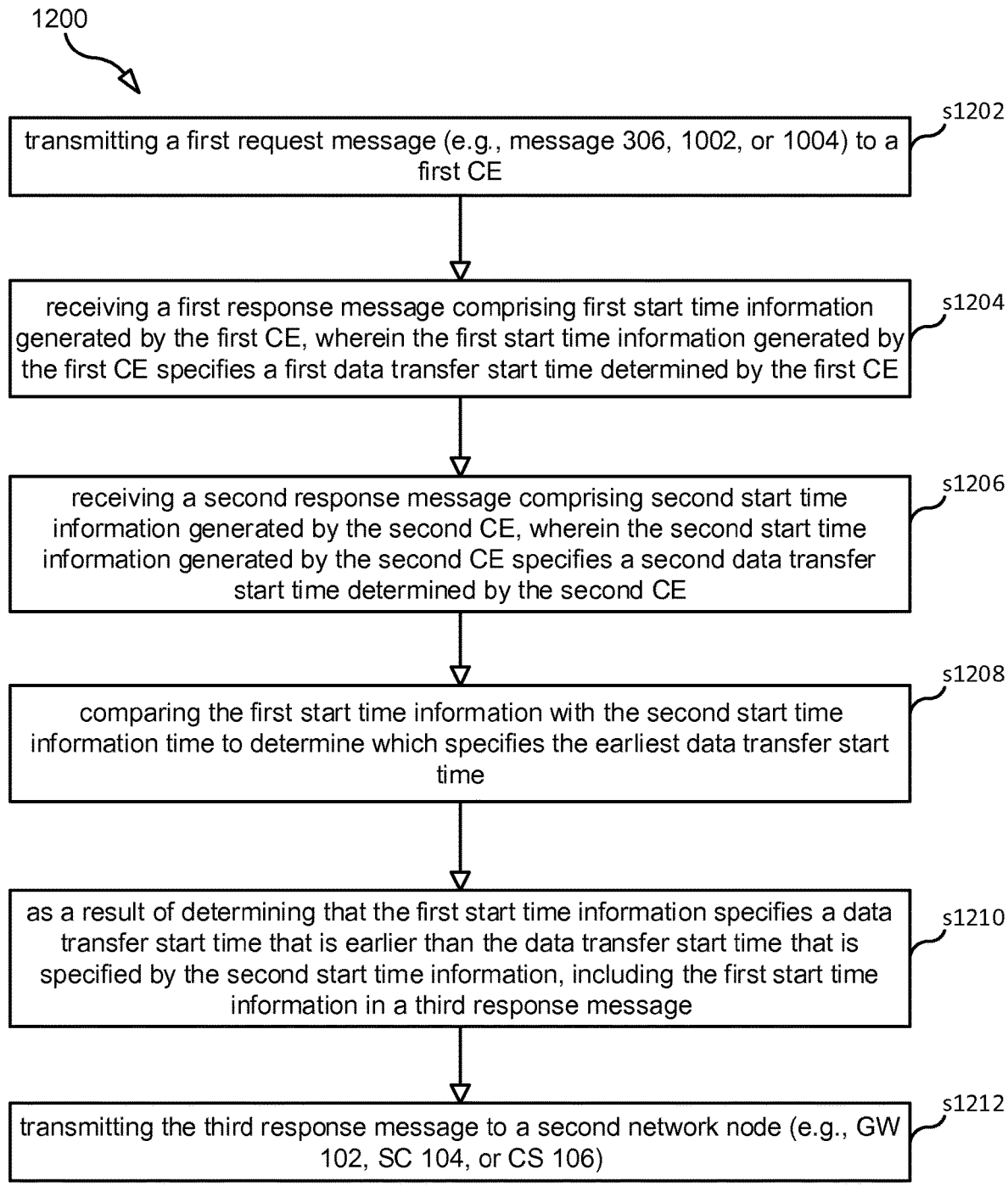
FIG. 12 is a flow chart illustrating a process according to one embodiment.

FIG. 12 is a flow chart illustrating a process 1200 performed by a network node (e.g., the network node may be GW 102, SC 104, or MMN 112). Process 1200 may begin in step s1202.

Step s1202 comprises the network node (NN) transmitting a first request message (e.g., message 306, 1002, or 1004) to a first coordination entity (e.g., CE 114). For example, in the case that the NN is SC 104, SC 104 may transmit the first request message to CE 114 by transmitting the request message to GW 102, which, in response to receiving the request message sends to CE 114 a request message via MMN 112.

Step s1204 comprises the NN receiving a first response message comprising first start time information generated by the first coordination entity, wherein the first start time information generated by the first coordination entity specifies a first data transfer start time determined by the first coordination entity.

Step s1206 comprises the NN receiving a second response message comprising second start time information generated by the second coordination entity, wherein the second start time information generated by the second coordination entity specifies a second data transfer start time determined by the second coordination entity.

Step s1208 comprises the NN comparing the first start time information with the second start time information time to determine which specifies the earliest data transfer start time.

Step s1210 comprises the NN, as a result of determining that the first start time information specifies a data transfer start time that is earlier than the data transfer start time that is specified by the second start time information, including the first start time information in a third response message.

Step s1212 comprises the NN transmitting the third response message to a second network node (e.g., GW 102, SC 104, or CS 106).

Figure 7:
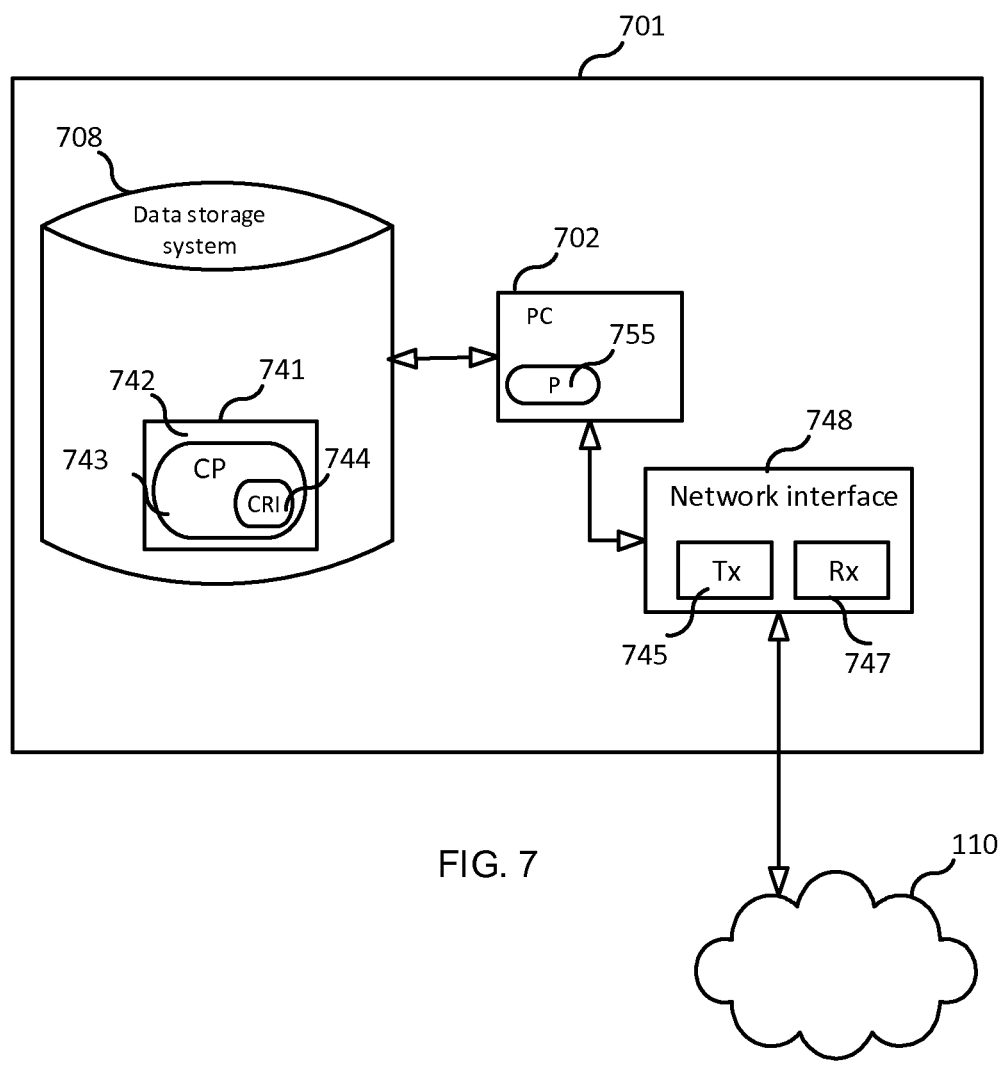
FIG. 7 is a block diagram of a network node according to one embodiment.

FIG. 7 is a block diagram of network node 701 for implementing any of SC 104, CS 106, MMN 112, CE 114, GW 102, according to some embodiments. As shown in FIG. 7, network node 701 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or data center or which may be geographically distributed; a network interface 748 comprising a transmitter (Tx) 745 and a receiver (Rx) 747 for enabling network node 701 to transmit data to and receive data from other nodes connected to a network 110 (e.g., an Internet Protocol (IP) network) to which network interface 748 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes network node 701 to perform steps described herein (e.g., steps described herein with reference to the flow charts). In other embodiments, network node 701 may be configured to perform steps described herein without the need for code. That is, for example, PC 702 may consist merely of one or more ASICs. Hence, the features of the embodiments described herein may be implemented in hardware and/or software.

Figure 8:
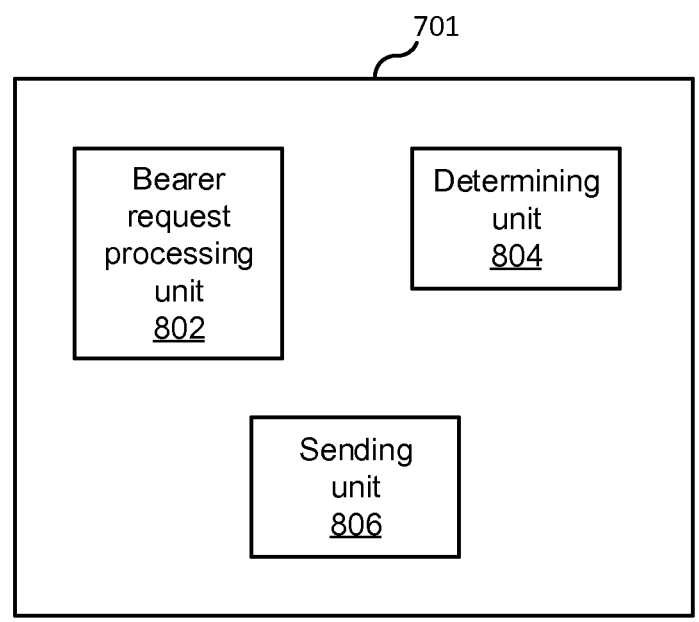
FIG. 8 is a diagram showing functional units of a network node according to one embodiment.

FIG. 8 is a diagram showing functional units of network node 701 according to one embodiment. In the embodiment shown, network node includes a message processing unit 802 for processing (e.g., parsing) a first bearer request message transmitted by the CS node, the first bearer request message requesting activation of a bearer; a determining unit 804 for determining a data transfer start time for the bearer; and a sending unit for employing transmitter 745 to send to the communication service node a first message comprising information specifying the determined data transfer start time.

Figure 9:
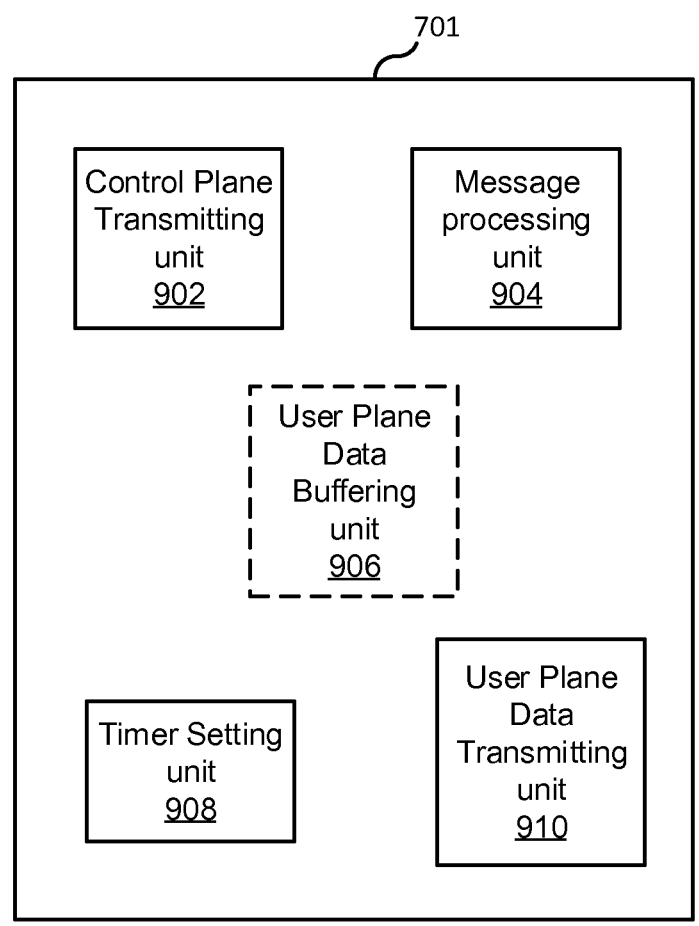
FIG. 9 is a diagram showing functional units of a network node according to one embodiment.

FIG. 9 is a diagram showing functional units of network node 701 according to another embodiment. In the embodiment shown, network node includes a control plane transmitting unit 902 for employing transmitter 745 to transmit to SC 104 a first bearer request message 302 requesting activation of a bearer; a message processing unit 904 for processing (e.g., parsing) a first message 304, 310 transmitted by SC 104, the first message comprising information specifying a determined data transfer start time for the bearer; a user plane data buffering unit 906 (optional) for buffering user plane data; a timer setting unit 908 for, after receiving the first message (304, 310), setting a timer to expire at a point-in-time selected based on the information indicating the data transfer start time; and a user plane data transmitting unit 910 for, as a result of detecting an expiration of the timer, employing transmitter 745 to transmit user plane data (e.g., the buffered user plane data, if any) to a particular destination point associated with the bearer.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing to a communication service, CS, node user plane timing information, the method comprising:
   receiving, at a service center, SC, a first bearer request message requesting activation of a bearer, wherein the first bearer request message was transmitted by the communication service node; and
   receiving the first bearer request message, performing a process comprising:
   determining, by the SC, a data transfer start time for the bearer, wherein the determined data transfer start time is an estimated data transfer start time estimated by the SC; and
   the SC sending to the CS node a first message comprising information specifying the determined data transfer start time.

2. The method of claim 1, wherein the first message transmitted to the communication service node is a first bearer response message responsive to the first bearer request message, wherein the first bearer response message comprises information indicating that the requested bearer activation was successful.

3. The method of claim 1, wherein
   the first bearer request message does not include information indicating a requested time at which the bearer shall be allocated, and
   the method further comprises, as a result of successfully processing the first bearer request message, the SC sending to a gateway a second message comprising the information specifying the determined data transfer start time.

4. The method of claim 3, wherein
   the method further comprises the SC receiving a response message, transmitted by the gateway, responsive to the second message, and
   the first message transmitted to the communication service node is transmitted by the SC as a result of the SC receiving the response message transmitted by the gateway.

5. The method of claim 4, wherein the first message is a bearer event notification message further comprising information indicating that the bearer was activated.

6. The method of claim 1, wherein
the first bearer request message includes time information indicating a requested time at which the bearer shall be allocated, and
the method further comprises, as a result of successfully processing the first bearer request message, the SC sending to a gateway a second message comprising the information specifying the determined data transfer start time.

7. The method of claim 6, wherein the determined data transfer start time is a point in time subsequent to the requested time indicated by the time information included in the first bearer request message.

8. The method of claim 1, further comprising:
the SC determining a data transfer stop time for the bearer; and
the SC transmitting to the communication service node a message comprising information indicating the data transfer stop time.

9. The method of claim 8, wherein
the method further comprises the SC receiving a second bearer request message transmitted by the communication service node,
the second bearer request message triggers the SC to determine the data transfer stop time, and
the message comprising the information indicating the data transfer stop time is one of: i) a second bearer response message that is responsive to the second bearer request message and ii) a bearer event notification message that is transmitted by the SC after the SC receives a particular response message from the gateway.

10. The method of claim 8, wherein
the first message is one of: i) a GAA command comprising an MBMS-Bearer-Response AVP comprising an MBMS-Data-Transfer-Start AVP containing the information specifying the determined data transfer start time and ii) a GNR command comprising an MBMS-Bearer-Event-Notification AVP comprising an MBMS-Data-Transfer-Start AVP containing the information specifying the determined data transfer start time, and
the message comprising the information indicating the data transfer stop time is one of:
i) a GAA command comprising an MBMS-Bearer-Response AVP comprising an MBMS-Data-Transfer-Stop AVP containing the information specifying the determined data transfer stop time and ii) a GNR command comprising an MBMS-Bearer-Event-Notification AVP comprising an MBMS-Data-Transfer-Stop AVP containing the information specifying the determined data transfer stop time.

11. The method of claim 1, wherein the determined data transfer start time is an actual data transfer start time and the SC determines the data transfer start time by receiving a response message transmitted by a gateway and obtaining from the response message start time information specifying the actual data transfer start time.

12. A method performed by a coordination entity, the method comprising:
receiving a request message comprising information specifying an estimated data transfer start time for a bearer, wherein the estimated data transfer start time is estimated by a service center;
after receiving the request message, determining an actual data transfer start time for the bearer based on the estimated data transfer start time;
generating a response message responsive to the request message, wherein generating the response message comprises including in the response message start time information specifying the actual data transfer start time for the bearer; and
transmitting the response message to the service center.

13. A network node comprising a processing circuitry configured to:
process a first bearer request message transmitted by a communication service node, the first bearer request message requesting activation of a bearer;
determine data transfer start time, wherein the determined data transfer start time is an estimated data transfer start time; and
send to the communication service node a first message comprising information specifying the determined data transfer start time.

14. A network node comprising a processing circuitry configured to:
transmit to a service center, SC, a first bearer request message requesting activation of a bearer;
process a first message transmitted by the SC, the first message comprising information specifying a determined data transfer start time for the bearer, wherein the determined data transfer start time is an estimated data transfer start time estimated by the SC;
set a timer to expire at a point-in-time selected based on the information indicating the data transfer start time; and
transmit user plane data to a particular destination point associated with the bearer as a result of detecting the expiration of the timer.

* * * * *